Feb. 5, 1952  A. A. GRIFFITH  2,584,198
SUPERSONIC AIRCRAFT AND WING STRUCTURE THEREFOR
Filed Feb. 21, 1949  3 Sheets-Sheet 1
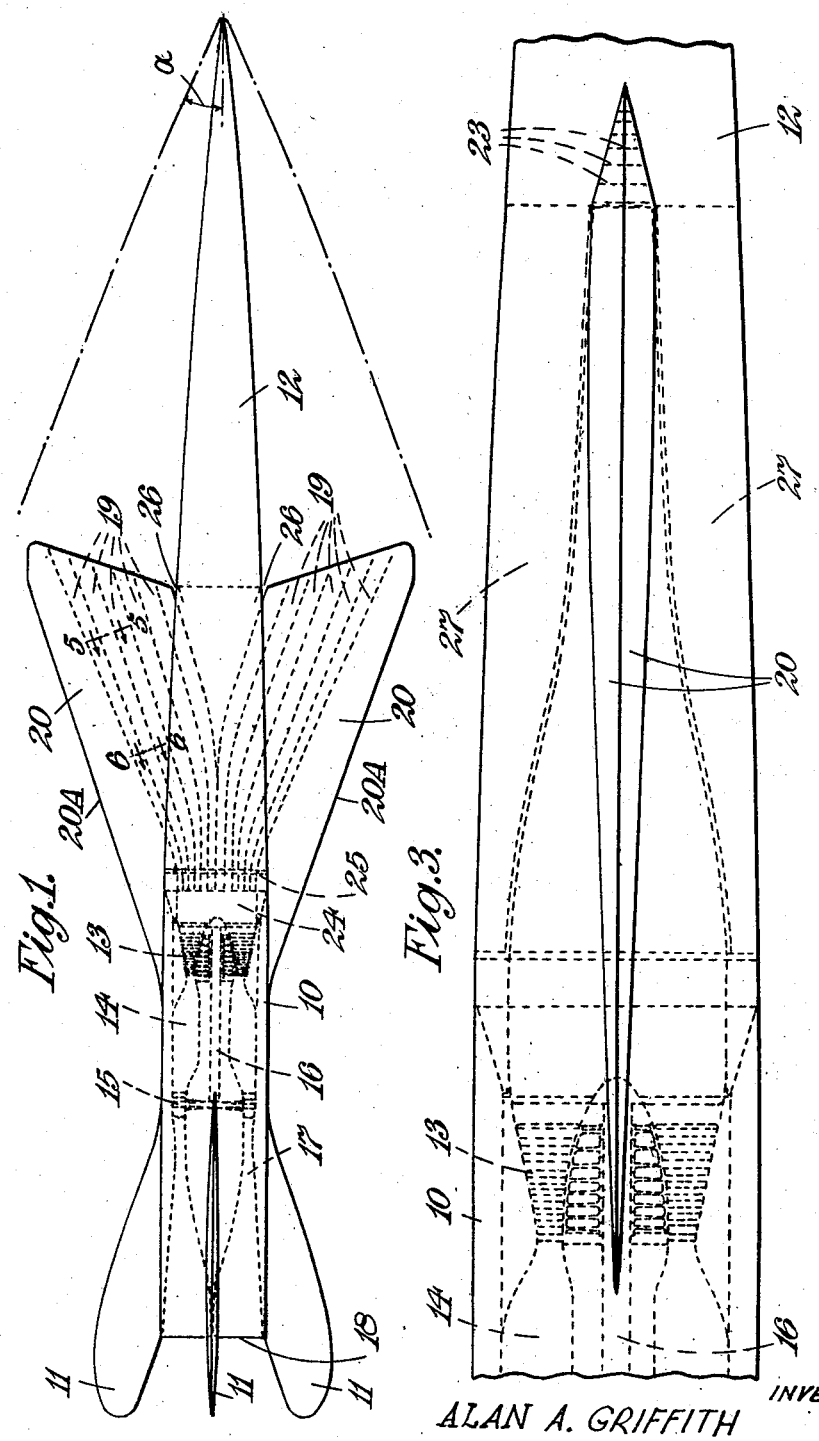
INVENTOR
ALAN A. GRIFFITH
by Wilkinson Mawhinney
Attorneys

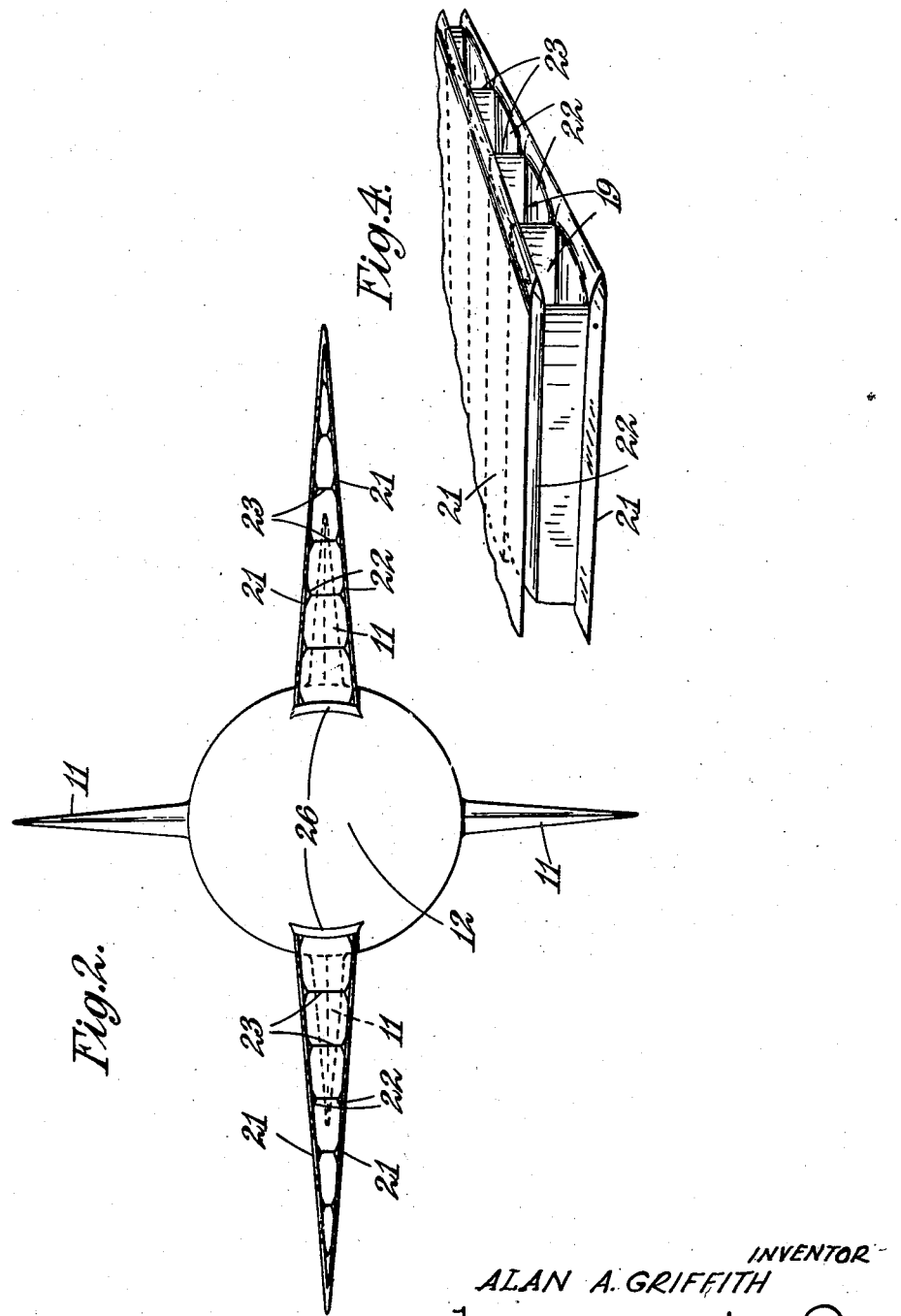

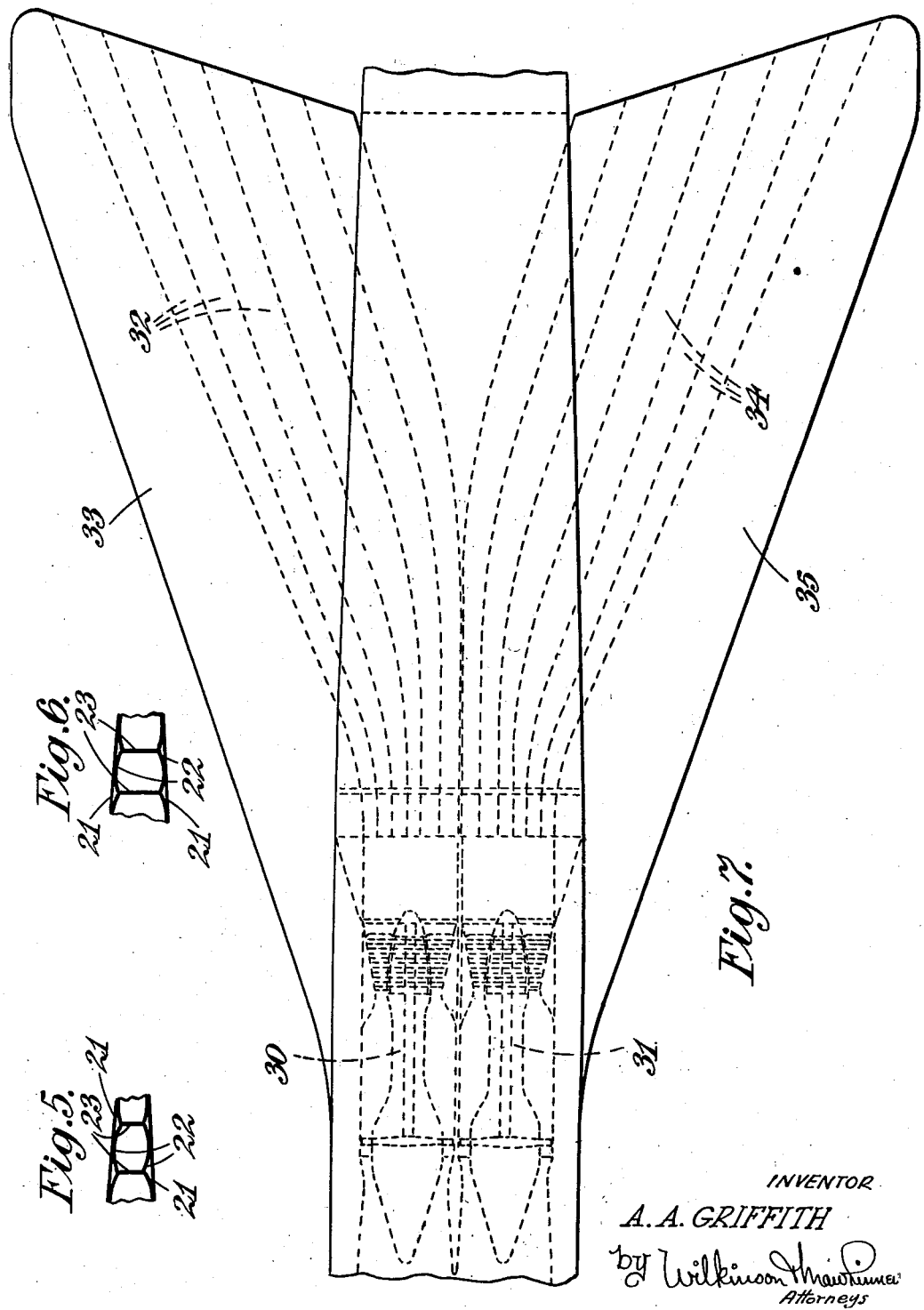

Patented Feb. 5, 1952

2,584,198

UNITED STATES PATENT OFFICE 2,584,198

SUPERSONIC AIRCRAFT AND WING STRUCTURE THEREFOR

Alan Arnold Griffith, Derby, England, assignor to Rolls-Royce Limited, Derby, England, a British company Application February 21, 1949, Serial No. 77,603
In Great Britain September 7, 1948

6 Claims. (Cl. 244—15)

This invention relates to aircraft and wing structures therefor. The invention is specifically concerned with aircraft designed to fly at supersonic speed, i. e., at a Mach number in excess of unity, such aircraft being hereinafter referred to as "supersonic" aircraft.

The term "aircraft" includes flying bodies such as guided missiles and pilotless machines, the invention being additionally applicable to pilot and passenger carrying aircraft of the supersonic kind.

The primary object of the invention is to provide a supersonic aircraft which is propelled by an air consuming power plant, in which overall drag and the structure weight of the aircraft are low.

According to this invention, the wing structure of a supersonic aircraft is made hollow, and substantially the whole of the leading edge constitutes an air intake to an air consuming propulsive system. The latter may for example be a gas turbine jet propulsion engine, or a ram-jet in which air is compressed due to the forward speed of flight, fuel being burnt in the compressed air to produce a high velocity propelling jet. Preferably, the maximum thickness of the wing at each chordal location is at the leading edge which provides the air intake, and the air passage constituted in the thickness of the wing is preferably divided to provide a number of ducts each of a diffusing nature leading into the propulsive system.

In a wing flying supersonically part of the drag is attributable to the shock wave which arises at Mach numbers in excess of unity, such shock wave drag being approximately proportional to the square of the thickness/chord ratio of the wing. Considering a supersonic wing entirely from the aerodynamic point of view, it has hitherto been considered desirable to use very thin wings to obtain a maximum lift/drag ratio under supersonic flight conditions. The design of such wing structures leads to excessive weight.

Another object of the present invention is to avoid the use of extremely thin wings in supersonic aircraft having air consuming power plants, without producing a corresponding increase in the shock wave drag of the aircraft.

Another object of this invention is to make it possible to use a supersonic wing of greater thickness/chord ratio and thus reduce the structural weight, without increasing the total drag of the aircraft under powered flight.

Thus a supersonic aircraft wing structure in accordance with the invention provides that the wave drag associated with the wing thickness is for the most part in the form of intake shock wave. The corresponding drag necessarily accompanies the intake of propulsive air whether the intake is combined with the wing, as in the present invention, or is separate. It follows that by combining the wing and intake in the manner of the invention, the wave drag normally associated with a thick wing is avoided so that in effect the wing is aerodynamically thin but structurally thick.

Two embodiments of the invention will now be described in order that the invention may be more clearly understood, reference being had to the accompanying drawings, of which:

Figure 1 is a plan of a supersonic aircraft embodying the invention;

Figure 2 is a front elevation of the aircraft illustrated in Figure 1, to a larger scale;

Figure 3 is a part side elevation to the same scale as Figure 2;

Figure 4 is a part isometric view of the wing structure of the aircraft illustrated in Figure 1, to a still larger scale;

Figures 5 and 6 are sectional views on the lines 5—5 and 6—6 of Figure 1; and

Figure 7 is a plan of another aircraft embodying the invention.

The aircraft illustrated in Figures 1–6 is a supersonic aircraft propelled by a gas-turbine plant, the design being suitable for flight at a Mach number of approximately 3 and comprises essentially a fuselage structure 10 with tail empennage having stabilising and/or steering fins 11. The nose portion 12 of the fuselage can constitute a warhead in the case of a guided missile or may provide pilot accommodation of a piloted aircraft. The nose portion is of sufficient length to provide that the shock wave formed by the leading edge, when the aircraft is flying at its designed flight speed, is at an angle $a$ to the longitudinal axis of the aircraft such that the shock wave clears the wing tips as indicated by the chain dotted lines.

The propulsive system comprises a gas-turbine jet propulsion engine accommodated in the fuselage 10 including an air compressor 13 delivering air to combustion equipment 14 in which fuel is burnt, the products of combustion passing to the turbine 15 which drives the compressor 13 through shaft 16. The exhaust flow from the turbine passes through exhaust duct 17 to a propelling nozzle 18.

The air intake to the gas turbine engine is provided by channels 19 formed between upper and lower surfaces of the wings 20.

As will be seen by particular reference to Figures 2 and 4 the upper and lower surfaces of each wing includes an outer skin 21 and inner skin 22. The outer skins are aerodynamically smooth and provide the requisite aerofoil shape whilst the inner skins are arched between webs 23, which space the upper and lower wing surfaces apart providing structural strength and also defining the sides of channels indicated at 19.

It will be observed that the channels 19 also make an angle of approximately α to the longitudinal axis of the aircraft.

The thickness/chord ratio may be substantially uniform spanwise, avoiding an excessive increase of this ratio at the root, the trailing edge 20A of the wing lying substantially parallel to the walls of the channels 19. Thus for a high speed aircraft as illustrated the aspect ratio of the wing is low.

In addition the leading edge of the wing is swept slightly forward so that the deflection of the air by the intake shock wave turns the air smoothly into the channels 19 through the intake openings in the leading edge of the wing, that is between the leading edges of the upper and lower wing surfaces, seen in Figures 2 and 4.

The maximum thickness of the wing is at its leading edge, and due to the increased thickness of the wing towards the root the passages 19 will be of a diffusing nature as between their entries and their exits into the air entry duct to the compressor. The latter entry indicated at 24 leads from an apertured bulkhead 25 which receives the exit ends of the channels 19. The diffusing nature of the ducts 19 can best be appreciated from Figures 5 and 6 which show sections of one duct at different places along its length, the section shown in Figure 5 being smaller in area and nearer the leading edge of the wing than the section in Figure 6.

At the junction of the leading edge of the wing 20 with the fuselage 10, suction slots 26 are provided to reduce disturbance in the air intake which might otherwise arise from the presence of the nose portion 12. Air abstracted by means of a suction pump from this area may be ejected rearwardly to assist in the propulsion of the aircraft.

It will be seen that the invention provides wings which are structurally stiff in bending and torsion, and though of relatively great thickness/chord ratio the aerodynamic shock wave drag attributable to such relatively great ratio can be assessed as including the intake drag associated with the air entry to the gas turbine engine.

In addition, the space within the fuselage, above and below the air entry passages provides space 27 (Figure 3) for the fuel, approximately at the centre of gravity of the aircraft.

Figure 7 shows another embodiment of the invention which is generally similar to that described above, but has two gas-turbine engines 30, 31 side by side. The engine 30 receives air from the ducts 32 in the wing 33, and the engine 31 receives air from the ducts 34 in the wing 35. The exhaust from both engines is ejected through a propulsion nozzle common to both of them.

The invention is also applicable to the flying wing structures in which the fuselage structure blends into the upper and lower surfaces of the wing and the tail empennage is sometimes obviated.

It is to be understood that the above embodiments are not intended to limit the invention, the scope of which is defined in the appended claims.

I claim:

1. In a supersonic aircraft, the combination of a fuselage, and air-consuming power-plant in said fuselage, a wing-structure comprising a wing on either side of said fuselage each of which wings has a root joining it to said fuselage, said wings each comprising an upper surface-member to provide an upper defining surface and a lower surface-member to provide a lower defining surface, said surfaces being joined together at a trailing edge common to both of them, and each of said surface-members having a forward edge spaced from the other surface-member over substantially the whole length of the edge, and an air-passage in each of said wings extending from said forward edges to said power-plant which air passages are of divergent cross-section from said forward edges.

2. An aircraft according to claim 1, wherein said surface-members are spaced apart by webs extending continuously from said forward edges into said roots, said webs constituting with said surface-members the boundaries of a plurality of air-ducts within each of said air-passages.

3. An aircraft according to claim 2 wherein said trailing edge of each of said wings is substantially parallel with said webs in that wing.

4. An aircraft according to claim 1 wherein said forward edges are swept slightly forwardly from said root.

5. In a supersonic aircraft the combination of a fuselage, an air-consuming power-plant in said fuselage, a wing-structure for said aircraft comprising a wing on either side of said fuselage, each of which wings has a root joining it to said fuselage, said wings each comprising an upper surface-member and a lower surface-member, said surface-members comprising each an outer skin and an inner skin, said outer skins providing respectively an upper defining surface and a lower defining surface of said wings, said defining surfaces being joined together at a trailing edge common to both of them, said surface-members having each a forward edge spaced from the other surface-member over substantially the whole length of the edge, said inner and outer skins of each of said surface-members being joined together at said forward edge of that member, an air-passage in each of said wings extending from said forward edges of said power-plant, and webs attached to said inner skins and extending within each wing continuously from said leading edges into said root of the wing in which it extends, said webs constituting with said inner skins of said surface-members, the walls of a plurality of air ducts within each of said air passages each of which air ducts is of divergent cross-section, said inner skins being arched between adjacent webs.

6. An aircraft according to claim 1, wherein the upper and lower surface members converge towards each other from the forward edge, so that the maximum thickness of said wing structure is between the forward edges of said surface members.

ALAN ARNOLD GRIFFITH.

REFERENCES CITED

The following references are of record in the file of this patent:

UNITED STATES PATENTS

| Number | Name | Date |
| --- | --- | --- |
| 1,725,914 | Hallowell | Aug. 27, 1929 |
| 2,376,862 | Bowen | May 29, 1945 |
| 2,470,348 | Haight | May 17, 1949 |
| 2,486,967 | Morrisson | Nov. 1, 1949 |

FOREIGN PATENTS

| Number | Country | Date |
| --- | --- | --- |
| 14,296 | Australia | July 9, 1928 |

OTHER REFERENCES

"Aircraft Engineering," issue of March 1948, page 77.